(12) United States Patent
Dandurand et al.

(10) Patent No.: US 7,229,141 B2
(45) Date of Patent: Jun. 12, 2007

(54) MANOEUVRABLE TRACTION TRACK

(75) Inventors: Jules Dandurand, Sherbrooke (CA); Denis Boisvert, St-Gerard (CA)

(73) Assignees: Tatou Inc. (CA); Camoplast Inc. (CA)

( * ) Notice: Subject to any disclaimer, the term of this patent is extended or adjusted under 35 U.S.C. 154(b) by 142 days.

(21) Appl. No.: 11/035,494

(22) Filed: Jan. 14, 2005

(65) Prior Publication Data

US 2005/0156466 A1 Jul. 21, 2005

(30) Foreign Application Priority Data

Jan. 16, 2004 (CA) .................................. 2455279

(51) Int. Cl.
*B62D 55/24* (2006.01)
(52) U.S. Cl. ...................................... 305/165; 305/178
(58) Field of Classification Search ................ 305/158, 305/165, 167, 170, 171, 177, 178, 180
See application file for complete search history.

(56) References Cited

U.S. PATENT DOCUMENTS

| | | | | |
|---|---|---|---|---|
| 3,934,664 A | * | 1/1976 | Pohjola | .................... 180/9.44 |
| 3,934,943 A | * | 1/1976 | Gage | .......................... 305/157 |
| 4,051,914 A | * | 10/1977 | Pohjola | .................... 180/9.44 |
| 4,119,356 A | * | 10/1978 | Pohjola | ....................... 305/158 |
| 4,188,076 A | * | 2/1980 | Pohjola | ....................... 305/165 |
| 5,474,146 A | * | 12/1995 | Yoshioka et al. | ........... 180/184 |
| 5,904,217 A | * | 5/1999 | Yamamoto et al. | ......... 180/193 |
| 6,352,320 B1 | | 3/2002 | Bonko et al. | |
| 6,505,896 B1 | * | 1/2003 | Boivin et al. | ............... 305/178 |
| 6,609,771 B2 | * | 8/2003 | Morin et al. | ................ 305/178 |
| 6,935,708 B2 | * | 8/2005 | Courtemanche | ............ 305/165 |
| 7,018,005 B2 | * | 3/2006 | Lemieux | ..................... 305/178 |
| 2004/0004395 A1 | * | 1/2004 | Soucy et al. | ................ 305/178 |
| 2004/0227401 A1 | * | 11/2004 | Courtemanche | ............ 305/165 |

FOREIGN PATENT DOCUMENTS

| | | |
|---|---|---|
| CA | 2037053 | 1/1991 |
| EP | 0 515 683 | 2/1991 |
| JP | 56-142763 | * 11/1981 |
| JP | 5-294270 | * 11/1993 |

* cited by examiner

*Primary Examiner*—Russell D. Stormer
(74) *Attorney, Agent, or Firm*—Akerman Senterfitt

(57) ABSTRACT

A one-piece track comprising, along each opposite edge thereof, regions having an accordion-type structure, which allows these regions to have a variable longitudinal length along each opposite edge of the track according to a movement of the tracked vehicle and to a corresponding inclination of the track.

10 Claims, 2 Drawing Sheets

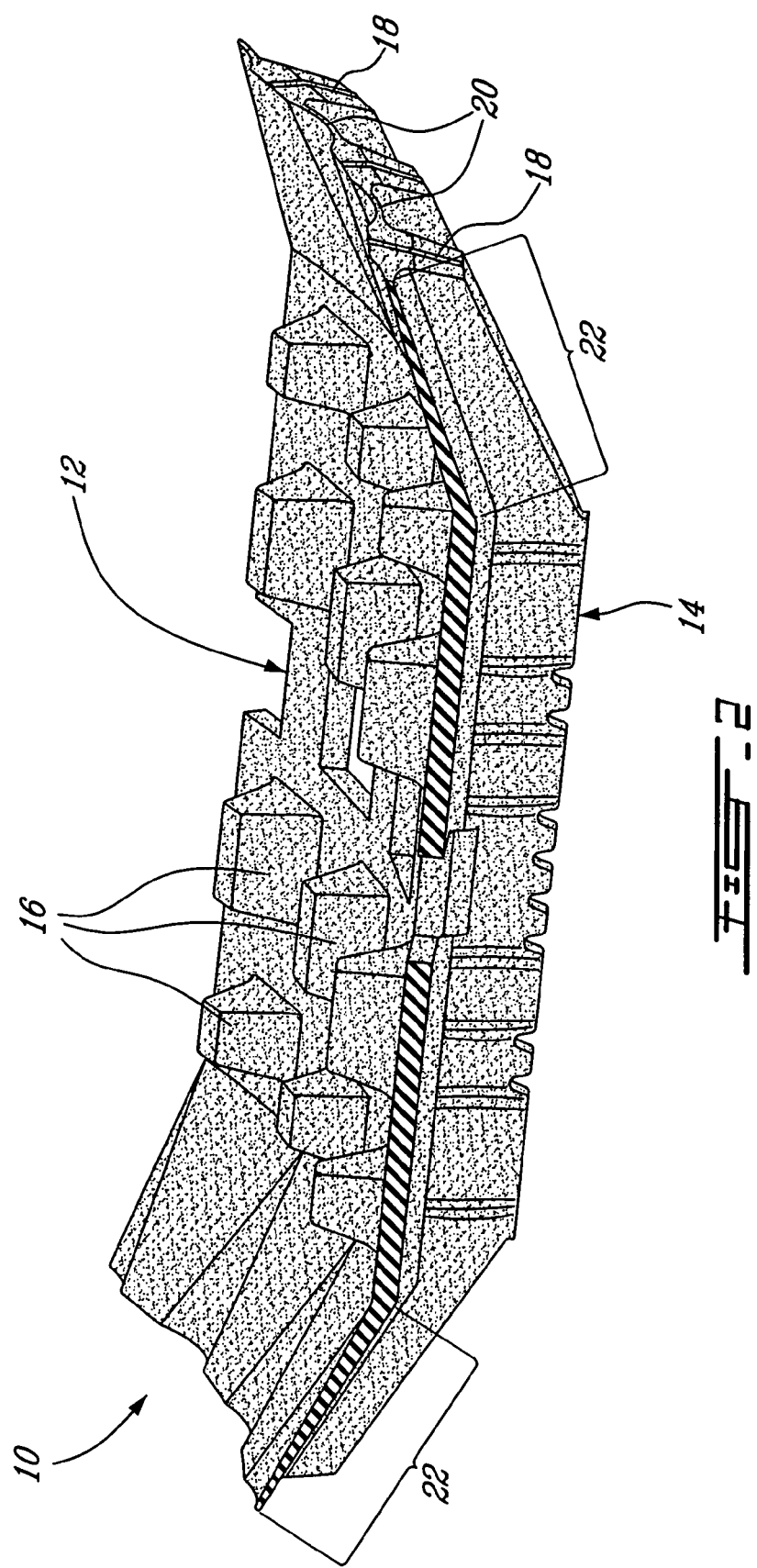

MANOEUVRABLE TRACTION TRACK

CROSS REFERENCE TO RELATED APPLICATIONS

This application claims priority on Canadian patent application CA 2,455,279 filed on Jan. 16, 2004. All documents above are herein incorporated by reference.

FIELD OF THE INVENTION

The present invention relates to tracks for recreational vehicles. More specifically, the present invention is concerned with a manoeuvrable traction track.

BACKGROUND OF THE INVENTION

U.S. Pat. No. 5,904,217 discloses an endless track belt for a snowmobile vehicle, wherein the track belt 70 has a right and a left inclined portions 73 formed at laterally opposite end portions of the track belt 70, in order to allow the vehicle to easily bank and turn.

The Canadian patent application no. 2,037,053 describes a track for a tracked motorcycle and the likes, which allows the vehicle to have a lateral inclination for example in a wide turn. Blocks and straps are used to give the track such a curvature.

There is still a need in the art for a maneuverable traction track.

SUMMARY OF THE INVENTION

There is provided an endless track belt having an endless elongated body with a ground contacting outer surface and an inner surface, wherein the ground-engaging surface comprises first regions having an accordion-type structure, and lateral edges of the track belt being curved.

There is further provided an endless track belt for a tracked vehicle, the endless track belt having an endless elongated body with a ground engaging outer surface and an inner surface, lateral edges thereof being curved, and the ground engaging surface comprising regions that expand and retract longitudinally according to a movement of the tracked vehicle and to a corresponding inclination of the track.

Other objects, advantages and features of the present invention will become more apparent upon reading of the following non-restrictive description of embodiments thereof, given by way of example only with reference to the accompanying drawings.

BRIEF DESCRIPTION OF THE DRAWINGS

In the appended drawings:

FIG. 2 is a perspective view of a section of an inner surface of the track of FIG. 1.

DESCRIPTION OF EMBODIMENTS OF THE INVENTION

Figure 1:
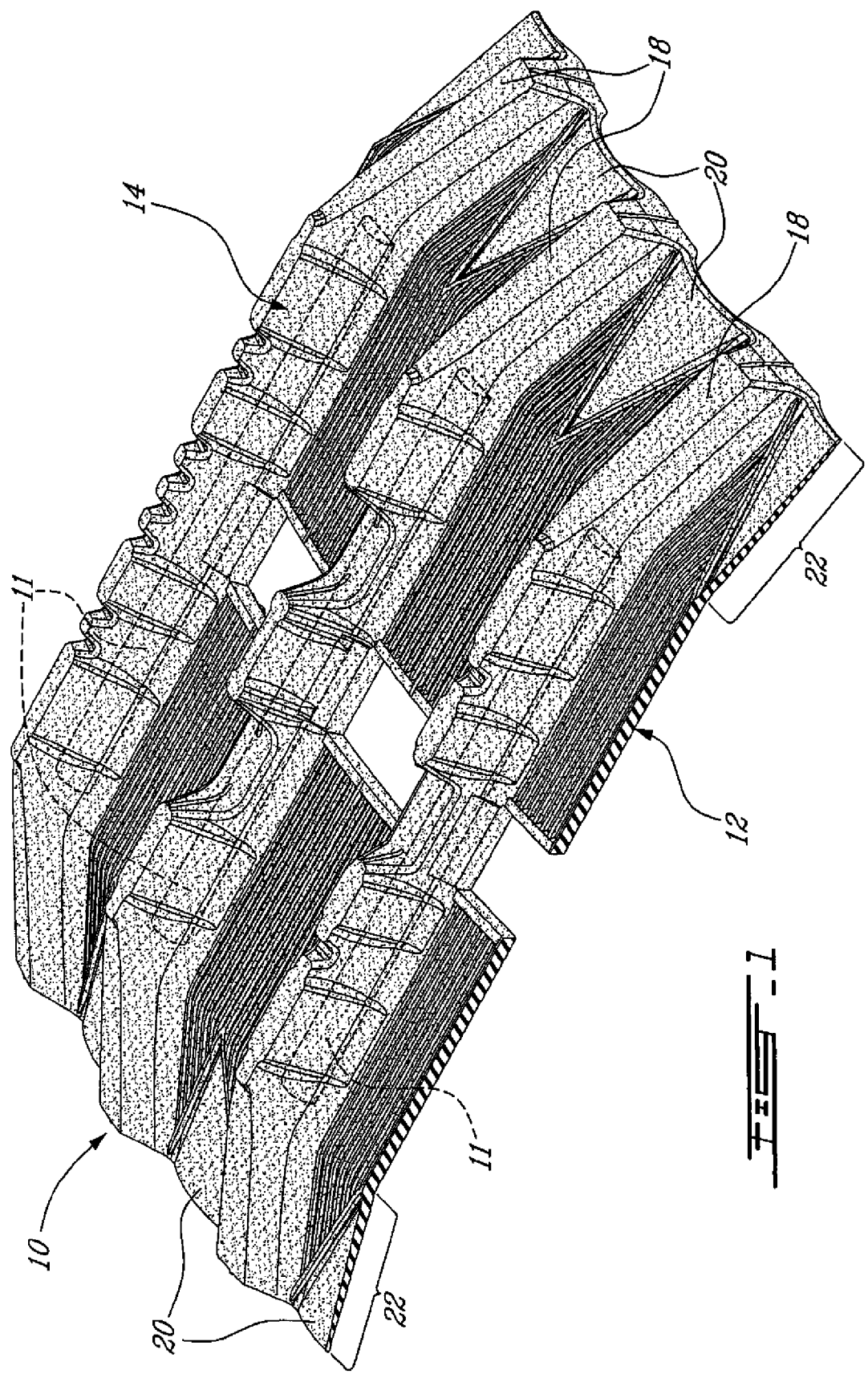
FIG. 1 is a perspective view of a section of a ground engaging surface of a track according to an embodiment of the present invention.

As illustrated in the Figures of the appended drawings, an endless track belt 10 comprises an endless elongated body made of polymeric material having a ground contacting outer surface 14 and an inner surface 12.

The core of the belt may be reinforced as is conventionally known.

As may be seen in FIG. 2, the inner surface 12 comprises a series of longitudinally spaced guide lug members 16, which are adapted to provide guiding of the track on an undercarriage of a tracked vehicle (not shown).

The ground engaging surface 14, best seen in FIG. 1, typically comprises regions 18 bearing a series of longitudinally spaced traction lug members, which provides a transversal rigidity to the track 10. It is found that a profile comprising longitudinally spaced traction lug members of a same height achieves an increased transversal rigidity to the track 10.

Furthermore, the ground engaging surface 14 of the track 10 comprises regions 20 located essentially between the regions 18. These regions 20 may have a variable longitudinal length along each opposite edge of the track 10, and they have an accordion-type structure, which allows these regions 20 to expand longitudinally or retract longitudinally according to a movement of the tracked vehicle (not shown) and to a corresponding inclination of the track 10.

In combination with curved lateral edges 22, such an accordion-type structure in regions 20 allows an increased flexibility along a length of the track 10, and thereby an improved manoeuvrability of the tracked vehicle (not shown), without reducing the transversal rigidity thereof.

Interestingly, the track 10 is made of standard materials used for a resilient track belt, and is molded as one piece.

People in the art will appreciate that the present track, which has lateral edges that are curved or bent as shown in FIG. 2, and provided with longitudinal accordion-type sections, benefits from a longitudinal flexibility as well as from a transverse rigidity.

The track of the present invention may be used for recreational vehicles such as, snowmobiles, ATV, as well as for tracked industrial vehicles.

Although the present invention has been described hereinabove by way of embodiments thereof, it may be modified, without departing from the nature and teachings of the subject invention as described herein.

The invention claimed is:

1. An endless track belt having an endless elongated body with a ground contacting outer surface and an inner surface, wherein the ground-engaging surface comprises longitudinally alternating first and second regions, said first regions being rigid, and said second regions having a bellows structure such that they are able to expand and refract longitudinally between said first regions, and wherein lateral edges of the track belt are bent.

2. The endless track belt according to claim 1, wherein said first regions bear spaced traction lug members.

3. The endless track belt according to claim 2, wherein each of said traction lug members have the same height.

4. The endless track belt according to claim 1, wherein said first regions bear traction lug members, wherein each of said traction lug members have the same height.

5. The endless track belt according to claim 1, comprising a reinforced core.

6. The endless track belt according to claim 1, made of a resilient material.

7. The endless track belt according to claim 1, molded as a one piece made of a resilient material.

8. The endless track belt of claim 1, used on one of a recreational vehicle and an industrial vehicle.

9. An endless track belt for a tracked vehicle, the endless track belt having an endless elongated body with a ground engaging outer surface and an inner surface, lateral edges thereof being bent, and the ground engaging surface comprising corrugated regions that expand and retract longitudinally according to a movement of the tracked vehicle and to a corresponding inclination of the track longitudinally alternating with rigid regions.

10. The endless track belt of claim 9, used on one of a recreational vehicle and an industrial vehicle.

* * * * *